S. Y. IVES.
Wagon-Brake.
No. 61,740.
Patented Feb. 5, 1867.
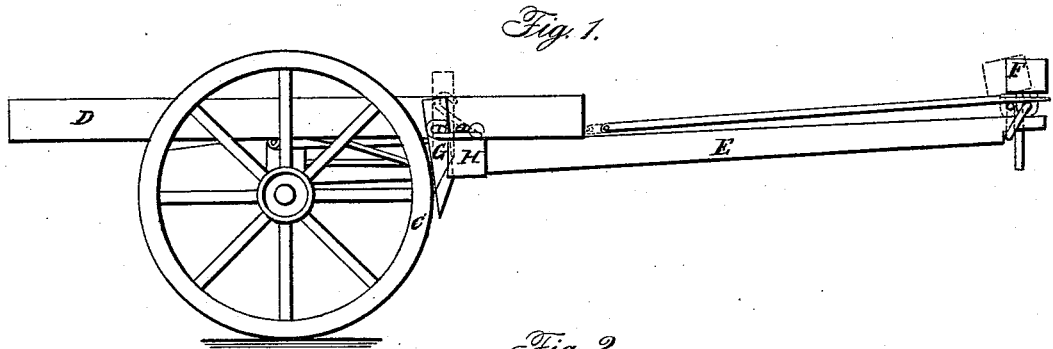
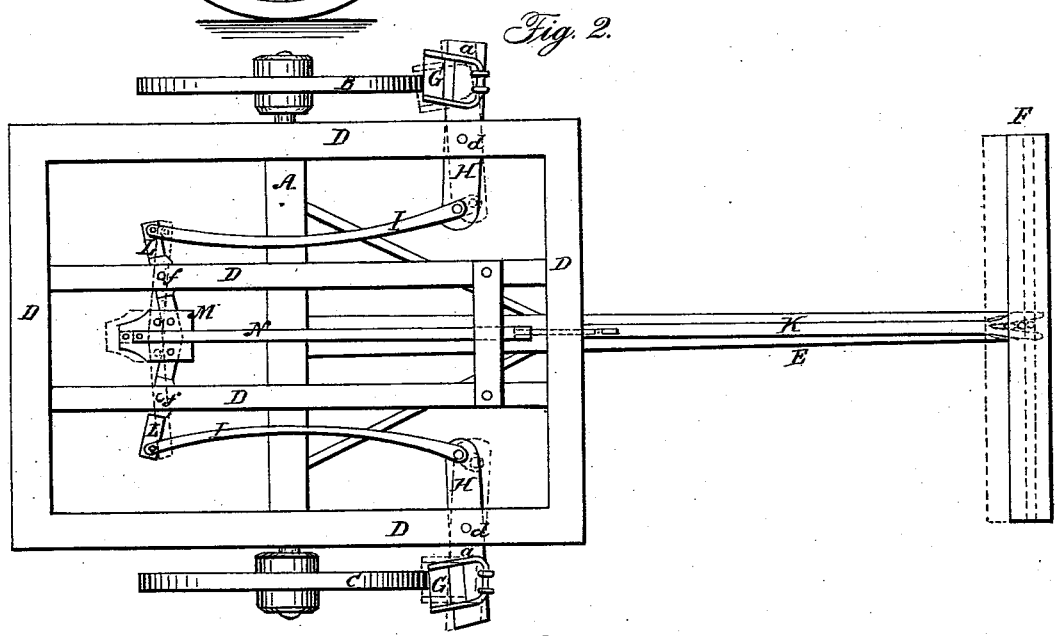
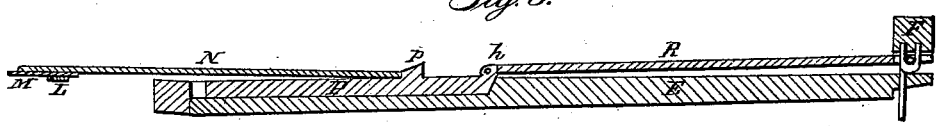
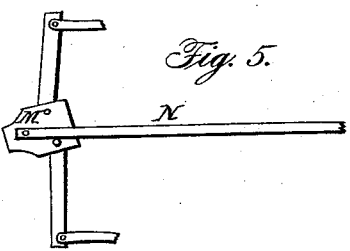
Witnesses:
Inventor:

United States Patent Office.

SILAS Y. IVES, OF MERIDEN, CONNECTICUT.

Letters Patent No. 61,740, dated February 5, 1867.

IMPROVEMENT IN CART BRAKE.

The Schedule referred to in these Letters Patent and making part of the same.

TO ALL WHOM IT MAY CONCERN:

Be it known that I, SILAS Y. IVES, of Meriden, in the county of New Haven, and State of Connecticut, have invented a new Improvement in Brake for Carts; and I do hereby declare the following, when taken in connection with the accompanying drawings and the letters of reference marked thereon, to be a full, clear, and exact description of the same, and which said drawings constitute part of this specification, and represent, in—

Figure 1, a side view of the framework and wheels of the cart to which my improvement is attached.
Figure 2, a top view of the same.
Figure 3, a longitudinal central section; and in
Figures 4 and 5, detached views to illustrate the operation of my invention.

My invention is designed for an automatic brake for carts, or for such vehicles as run upon two wheels; and my invention consists in a mechanism whereby the brake is brought to bear upon the wheels on a descent, and yet arranged so that the cart may be run back without hindrance from the brake.

To enable others to construct and use my improvement, I will proceed to describe the same, as illustrated in the accompanying drawings.

A is the axle; B C, the wheels; D, the frame; E, the neap, and F, the yoke, all of common and well-known construction. G G are shoes hung to a lever, H, by a link, a, so that the shoes may be freely raised to the position denoted in red, fig. 1. The said levers H are pivoted to the frame at d, and are connected, from their inner ends, by rods I to other levers L and L, hung to the frame at f. The inner ends of the two levers, L and L are pivoted to what I term an equalizer, M; to the said equalizer I pivot one end of a rod, N, which lies upon the top of the neap, as seen in figs. 2 and 3. Beneath the rod N, and in a recess or groove formed in the neap, I place a sliding-bar, P, to the outer end of which is attached a rod, R, as seen in fig. 3, extending forward to the yoke, and forked so as to permit the eye in the yoke to rest therein and support the outer end of the bar in the proper position. The said rod R is attached to the bar P by a pin at $h$, or other device, so that the rod R may be conveniently detached. On the bar P I form a projection, $p$, so as to bear against the end of the rod N. When the cart is being drawn over level or ascending ground, the yoke will be in the position as denoted in black, (see figs. 1 and 2,) in which position the shoes and their operative mechanism are also denoted in black; but when descending, or, at other times, when the cart is advancing, if the yoke is brought back to the position denoted in red, the eye in the yoke presses back on the rod R, thence, through the projection on the bar P, upon the rod N, forcing back the equalizer, to operate the levers H to bear the shoes G against their respective wheels, as denoted in red, fig. 2; and thus bearing against the wheels until the progress of the cart is arrested, or until the yoke is moved forward to release the rod R, and consequently relieve the wheels from the action of the shoes. The office of the equalizer M is to cause the shoes to bear equally upon each wheel, which it will do by being turned to either side, as seen in fig. 5, by the operation of which any unevenness of the wheels will be fully compensated for. In order that the brake thus applied may not interfere with a backward movement of the cart, the shoes are each hung by a link, a, to the lever H, as seen in fig. 1, so that a backward movement of the wheel will raise the shoes as denoted in red, relieving the wheels entirely from the effect of the shoes; and, when the cart again moves forward, the shoes will fall to their natural position, as denoted in black. The shoes G and their levers H are formed, as seen in fig. 4, so that the shoes bear only upon the lower edge of the levers H, and so that, as the shoes rise, they fall rapidly back. A large bearing upon the lever would create so much friction that the shoes would not be raised on a backward movement of the wheel. I have described the equalizer as being moved by the rod R through the bar P and rod N; and this construction I prefer; yet the rod N may be extended along the neap so as to dispense with the bar P and the rod R.

I do not wish to be understood as to claim as my invention a self-acting brake, as such is not new, and may be found in the patents of Thomas Service, April, 1861, Miller & Grub, January, 1864, and others.

Having, therefore, thus fully described my invention, what I claim as new and useful, and desire to secure by Letters Patent, is—

1. The combination and arrangement described of the shoes G, the levers H and L, with the equalizer M and the rod N, substantially in the manner and for the purpose specified.

2. In combination with the above, I claim the bar P and rod R, constructed and arranged to operate substantially in the manner and for the purpose specified.

3. I claim the combination of the shoe G and lever H, when linked together so as to operate substantially as and for the purpose specified.

SILAS Y. IVES,

Witnesses:
JOHN E. EARLE,
JOHN H. SHUMWAY.